US012556516B2

(12) United States Patent
Arora et al.

(10) Patent No.: US 12,556,516 B2
(45) Date of Patent: Feb. 17, 2026

(54) EDGE CONNECTIVITY GATEWAY

(71) Applicant: Microsoft Technology Licensing, LLC, Redmond, WA (US)

(72) Inventors: Prasidh Arora, Seattle, WA (US); Manoj Kumar Ampalam, Suwanee, GA (US); Nikhil Mhatre, Kirkland, WA (US); Barath Hassan Venugopal, Woodinville, WA (US); Arun Ramachandran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 18/478,309

(22) Filed: Sep. 29, 2023

(65) Prior Publication Data
US 2025/0047646 A1     Feb. 6, 2025

Related U.S. Application Data

(60) Provisional application No. 63/516,706, filed on Jul. 31, 2023.

(51) Int. Cl.
*H04L 9/40*     (2022.01)
(52) U.S. Cl.
CPC ...... *H04L 63/0281* (2013.01); *H04L 63/0209* (2013.01); *H04L 63/04* (2013.01); *H04L 63/166* (2013.01); *H04L 63/20* (2013.01)
(58) Field of Classification Search
None
See application file for complete search history.

(56) References Cited

U.S. PATENT DOCUMENTS

| 11,546,156 | B1 * | 1/2023 | Hendry | .............. H04L 9/0861 |
| 12,425,491 | B1 * | 9/2025 | Fregly | .............. H04L 63/0281 |

(Continued)

FOREIGN PATENT DOCUMENTS

| WO | 2017218013 A1 | 12/2017 |
| WO | 2022076995 A1 | 4/2022 |
| WO | 2023043727 A1 | 3/2023 |

OTHER PUBLICATIONS

"Application-Layer Protocol Negotiation", Retrieved from: https://en.wikipedia.org/wiki/Application-Layer_Protocol_Negotiation, Oct. 18, 2022, 3 Pages.

(Continued)

*Primary Examiner* — Farid Homayounmehr
*Assistant Examiner* — Suman Debnath
(74) *Attorney, Agent, or Firm* — Holzer Patel Drennan

(57) ABSTRACT

A disclosed method facilitates communications between an edge device and a cloud-based service component via an enterprise proxy without configuring the enterprise proxy to allow access to a service domain associated with the cloud-based service component. The method includes receiving, at a first proxy on the edge device, a service domain connection request from the service agent that specifies a service domain associated with the cloud-based service component. The first proxy responds to the first connection request by transmitting a sequence of nested connection requests including an inner connection request and an outer connection request. The inner connection request establishes a first communication channel between the first proxy and a cloud-based gateway. The outer connection request is transmitted along the first communication channel and establishes a second communication channel between the cloud-based gateway and the service domain requested by the service agent.

20 Claims, 4 Drawing Sheets

(56) References Cited

U.S. PATENT DOCUMENTS

| | | | |
|---|---|---|---|
| 2002/0138623 A1* | 9/2002 | Boden | H04L 63/0272 |
| | | | 709/227 |
| 2018/0343316 A1 | 11/2018 | Meyer et al. | |
| 2019/0349253 A1 | 11/2019 | Zhang et al. | |
| 2020/0014661 A1 | 1/2020 | Mayya et al. | |
| 2021/0273987 A1 | 9/2021 | You et al. | |
| 2022/0103370 A1* | 3/2022 | Alwen | H04L 61/45 |
| 2023/0045949 A1 | 2/2023 | Wondra | |
| 2023/0079444 A1* | 3/2023 | Parla | H04L 45/42 |
| | | | 726/11 |

OTHER PUBLICATIONS

"HTTP tunnel", Retrieved from: https://en.wikipedia.org/wiki/HTTP_tunnel#HTTP_CONNECT_method, Jun. 21, 2023, 3 Pages.

Altimore, et al., "How an IoT Edge device can be used as a gateway", Retrieved from: https://learn.microsoft.com/en-us/azure/iot-edge/iot-edge-as-gateway?view=iotedge-1.4, Feb. 3, 2023, 7 Pages.

International Search Report and Written Opinion received for PCT Application No. PCT/US2024/037487, mailed on Oct. 9, 2024, 16 pages.

\* cited by examiner

EDGE CONNECTIVITY GATEWAY

CROSS-REFERENCE TO RELATED APPLICATIONS

This application claims the benefit of priority to U.S. provisional patent application Ser. No. 63/516,706, entitled "Edge Connectivity Gateway" and filed on Jul. 31, 2023, which is hereby incorporated by reference for all that it discloses or teaches.

BACKGROUND

Enterprises relying on cloud-based services often run a mix of applications, some of which are hosted by cloud-based data centers and some of which are hosted by edge computing devices. The term "cloud-based" refers to a physical location of a device or executable component that is remote from the enterprise or user served by functionality of the device or executable component (e.g., a server at a data center). The term "edge computing devices" refers to devices physically located on-premises at the enterprise-meaning, near to the collection and/or storage point of enterprise data subject to workload operations of the edge computing device. Although the proliferation of cloud-based software-as-a-service (SAAS) offerings has caused many SAAS customers to migrate their workloads to the cloud, there are a subset of workloads and infrastructures that continue to remain on edge devices. Examples of workloads commonly executed on the edge include those that, for various reasons, need to be able to execute without internet (e.g., retail point of sale), operate on exceptionally large files that cannot be migrated to the cloud without presenting complex bandwidth, latency, and/or data storage challenges (e.g., security camera footage processing), that require low latency (e.g., video editing), and much more.

Many enterprises still wish to implement the same centralized security and management services for their on-premises infrastructure as is currently implemented for their existing cloud infrastructure. For this reason, various cloud-based SAAS providers have built software solutions designed to execute on edge devices to provide those edge devices with services and experiences similar to those of existing cloud-based offerings. Examples of these edge technologies include a variety of downloadable "agents" (e.g., offered by Microsoft Azure Arc), such as services for device security, device monitoring, device identity management, and more.

Edge solutions that extend cloud resident services to on-premises deployments, or that require cloud-resident connections, introduce security and operational challenges currently navigated by the SAAS customer (e.g., the enterprise) in various fragmented ways, such as through online documentation that is specific to each individual component or service. These security and operational challenges are onerous enough to deter many SAAS customers from trying edge device services.

SUMMARY

According to one implementation, a method is disclosed for establishing a communication channel between a cloud-based service and a service agent executing on an edge device. The method includes receiving, at a first proxy of the edge device, a service domain connection request from the service agent that specifies a domain associated with the cloud-based service. The method further includes transmitting, by the first proxy, a sequence of nested connection requests in response to receipt of the service domain connection request. The sequence of nested connection requests includes an inner connection request that establishes a first communication channel between the first proxy and a cloud-based gateway via an outbound proxy of the enterprise and an outer connection request that establishes a second communication channel between the cloud-based gateway and the service domain requested by the service agent. The third connection request is transmitted, by the first proxy, along the first communication channel, thereby extending the channel to the service domain.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
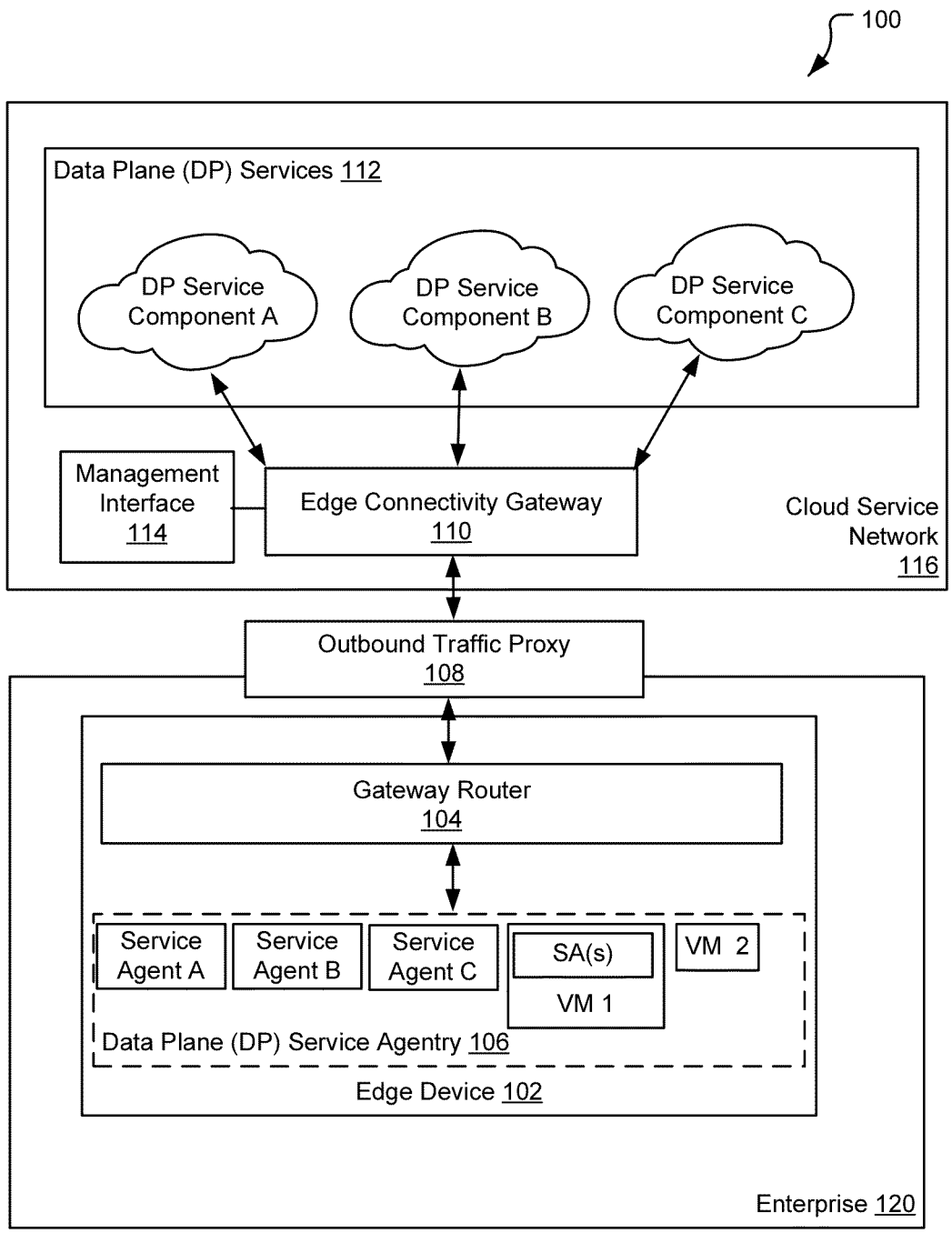
FIG. 1 illustrates an example system implementing a unified platform that facilitates secure execution of data plane (DP) service agents on an edge device of an enterprise without requiring the enterprise to update or change security configuration settings for each newly-installed DP service agent.

Cloud management of edge infrastructure is performed via agentry running on on-premises infrastructure interacting with various data plane (DP) services of a distributed cloud system. For example, an enterprise downloads multiple different "agents" to locally execute on each of multiple edge devices of the enterprise (where "edge devices" refers to on-premise devices at the enterprise configured to perform compute functions on behalf of the enterprise). Each of these different downloadable agents provides the respective edge computing device with service functionality of an associated DP cloud service. In the following description, these edge device agents providing respective DP services are referred to as "DP service agents." Configuration of edge infrastructure needed to support DP service agents is complicated by each different enterprises' existing security configurations and security policies.

As one example of the above, many enterprises (e.g., companies, government organizations) block or limit outbound traffic from on-premises infrastructure to the public internet to ensure there are no open outbound communication channels that might present a "doorway" for unwanted inbound communications (e.g., viruses, malware, unauthorized accesses). In a typical implementation of this, the enterprise routes all outbound communications through a proxy, which may perform operations similar to a firewall, permitting through-traffic only to specific endpoints specified in an "allowed" list. Executing one or several different DP service agents on a machine subject to these types of security requirements entails extensive on-premise configuration changes because each different DP service agent may require connectivity to a different collection of endpoints (domains), meaning that these endpoints have to be added to the "allowed" list in the enterprises' security configuration. Given the various cloud services involved in delivering an end-to-end solution (identity, authentication, monitoring, security, etc.), the list of endpoints grows as the number of cloud services grow. Even for a single basic individual DP service agent, the list of endpoints can go into the dozens. The burden of both identifying these requisite domains and reconfiguring the security parameters of the enterprise (or several machines individually) serve to deter enterprises from trying DP services and exploring their respective functionalities.

Moreover, even if an enterprise is willing to try to modify its security configuration to support a particular DP service, some more restrictive enterprise policies prohibit the types of configurations that are required by certain DP services. Specifically, many DP service agents require edge device connectivity to wildcard domains, such as by allowing a request to "*.contoso.com" where * is any website with the associated domain suffix. However, wildcarding is not supported by some commonly-implemented enterprise proxies and also not allowed by some enterprise network security policies.

Still additional edge device configuration complications relate to the fact that standard enterprise proxies tend to provide very coarse access control with respect to policies governing outbound network access for an enterprise. The security configurations of an enterprise's outbound traffic proxy are typically automatically applied to the entire on-premise network of the enterprise. In this case, allowing a single edge device to communicate with a set of cloud endpoints through the outbound traffic proxy entails allowing all other enterprise devices to also communicate with those endpoints through the outbound traffic proxy. These types of security configurations that provide unnecessary unconditional access to cloud endpoints run afoul of many best practice security policies.

Disclosed herein is a unified platform that drastically simplifies the task of configuring an enterprise network to support execution of DP service agents on various edge devices of the enterprise. The unified platform allows DP service agents to connect to their required cloud-endpoints without specifically re-configuring the outbound traffic proxy of the enterprise (e.g., the enterprise's firewall) to permit access to those endpoints. Consequently, the enterprise is not required to alter its security configuration each time a DP service agent is newly added to an edge device of the enterprise. In one implementation, the foregoing is achieved while also providing administrator(s) of the enterprise with a finer level of security control (e.g., endpoint control on a per-device basis) than is possible in using most existing enterprise security configurations. Specifically, the disclosed platform includes a feature that allows endpoint access to be optionally controlled on a per-device basis, making it possible to restrict access to DP service endpoints to a subset of on-premise devices that actually need access to those endpoints. This level of control is more granular than the endpoint access control that is permitted by some enterprise firewalls.

In addition to the above technical advantages, the proposed architecture can be implemented without changing software in any of the DP service agents installed on edge devices and by performing a simple (one-time) change the enterprise's security configuration to allow access to a cloud-based gateway.

According to one implementation, the unified platform includes a routing module (referred to herein as a gateway router) that executes on an edge device and that implements logic for securely tunneling outbound requests from various locally-executing DP service agents to a cloud-based gateway operated by a same DP service provider as the DP services associated with each of the agents. Each of the outbound requests is tunneled to the cloud-based gateway via an outbound proxy of the enterprise (e.g., the enterprise's firewall) and the cloud-based gateway acts as another proxy that services connections between the outbound proxy of the enterprise and each of the requested DP services.

In one implementation, the above-mentioned secure tunneling is implemented by transmitting, from the routing module, a sequence of nested hypertext transfer protocol (HTTP) connect requests. A first one of these nested HTTP requests is effective to create a first tunnel between the routing module and a cloud-based gateway via an outbound proxy of the enterprise. A second one of these nested HTTP requests extends the first tunnel by an additional "hop," adding a forwarding channel between the edge connectivity gateway and a DP service. This second HTTP request is "nested" because it originates at the same device as the first HTTP request and utilizes the tunnel created by the first HTTP request. As a result of these two nested connects, the software component on the edge device can communicate with the DP service, and the outbound proxy of the enterprise does not need to be configured to "allow" communications with the DP service.

FIG. 1 illustrates an example system 100 implementing a unified platform that facilitates secure execution of DP service agents on an edge device 102 of at a facility owned by an enterprise 120 without requiring the enterprise to update or change security configuration settings for each newly-installed DP service agent on the edge device 102. Various data plane (DP) service agentry 106 is stored in memory of the edge device 102 and locally executed on the edge device 102.

The DP service agentry 106 comprises various DP service agents (e.g., service agent A, service agent B, service agent C) that are installed on-premises for cloud management. In some implementations, additional DP service agents are deployed within virtual machine(s) executing on the edge device 102 (shown in FIG. 1 as SA(s) in VM1). Each of the different DP service agents is designed to provide the edge device 102 with the functionality offered by a corresponding cloud-based DP service offering (e.g., DP service component A, DP service component B, DP service component C) by communicating with various cloud components to make the edge device 102 manageable from the cloud. For example, Service Agent A may be a monitoring agent that provides cloud-based monitoring, a backup agent that provides cloud-based backup, or a management agent provides cloud-based management. Each of the DP service agents communicates with a corresponding data plane (DP) service in the cloud via a uniform resource locator (URL), collectively represented in FIG. 1 as DP services 112 including DP service component A, DP Service component B, and DP service component C. The list of DP service agents running for a specific edge scenario depends on the number of services that a customer has enabled. Some of the individual DP service agents depend upon interactions with third-party tools that are either locally installed on the edge device 102 or reachable via the internet.

In one implementation, various components of the DP service agentry 106 are configured to assume the managed identity of the hosting resource when communicating with the respective DP services 112.

In a traditional system supporting DP service agentry on edge devices that does not implement the herein disclosed technology, the individual URLs for each DP service needs to be allow-listed n the security configuration of the outbound traffic proxy 108. In these traditional systems, outbound traffic from the DP service agentry 106 to the cloud DP service must be explicitly permitted in order for the on-premises component to be manageable from the cloud. As is described further below, this is not the case in the system 100.

In addition to the DP service agentry 106, the on-premise network of the enterprise 120 further includes an outbound traffic proxy 108. In computing, the term "proxy" refers to a system or router that provides a gateway between users and the internet. One example of a proxy is a firewall that defines the perimeter of a network and that also identifies and blocks potentially suspicious and malicious traffic. Other types of proxies serve other functions, such as helping to protect privacy and/or help to enforce corporate policies regarding internet browsing. The outbound traffic proxy 108 can be implemented in a variety of different types of proxies. The outbound traffic proxy 108 supports standard http-connect protocol to proxy transport layer security (TLS)-based traffic. In one implementation, the outbound traffic proxy 108 runs at the L7 layer and comprises standard components that can be purchased and used off-the-shelf to govern outbound network access, primarily for monitoring and security. In some implementations, the outbound traffic proxy 108 includes a firewall and another type of proxy as separate components. In other implementations, the outbound traffic proxy 108 includes a firewall and another type of proxy integrated into a same hardware. The outbound traffic proxy 108 supports the ability to allow and block traffic based on the URL. While common in many enterprises, the outbound traffic proxy 108 is an optional component that may not be included in all implementations of the disclosed technology.

A new component of the system 100 that does not exist in previous DP service agent configurations is a gateway router 104, which may be understood as comprising software executing on the edge device 102. The gateway router 104 enables routing of traffic from the service agentry 106 to the gateway, via the outbound traffic proxy 108. In one implementation, every edge device that the enterprise 120 wants to have managed from the cloud is configured to execute an instance of the gateway router 104 that is available as the default proxy for all DP service agents. The gateway router 104 facilitates routing, via the outbound traffic proxy 108, of traffic outbound from the DP service agentry 106 to a cloud-based gateway referred to herein as an edge connectivity gateway 110. In one implementation, the gateway router 104 listens to the DP service agentry 106 on a standard http-connect compliant interface that the agentry inherently supports. In other implementations, the gateway router 104 communicates with the edge connectivity gateway 110 and/or the DP service agentry 106 via protocol other than HTTP-Connect, such as the virtual private network (VPN) protocol or other suitable protocol.

The agentry and tooling within the DP service agentry 106 is configured to direct all outbound traffic to the gateway router 104 by specifying the gateway router 104 as its forwarding proxy. In turn, the gateway router 104 is configured to communicate with the edge connectivity gateway 110 using the outbound traffic proxy 108 as its forwarding proxy.

In various implementations, the gateway router 104 has different characteristics and different functionality. In general, the gateway router 104 is configured to serve as an http-connect interface for local agentry and tooling installed on the on-premise device and also perform handshake and authentication actions (e.g., to authenticate itself) with both the outbound traffic proxy 108 of the enterprise and the edge connectivity gateway 110.

The edge connectivity gateway 110 acts as a common front-end for traffic outbound from the DP service agentry 106. In one implementation, the edge connectivity gateway 110 is serviced on a specific domain, and the outbound traffic proxy 108 is configured (e.g., by the enterprise) to allow outbound traffic to this single domain. Execution of the DP service agentry 106 does not require outbound connections to any domain except for the domain servicing the edge connectivity gateway 110.

The edge connectivity gateway 110 has access to a list of domains that it is permitted to access (the various DP services). In one implementation, this list is managed by a service team of the cloud service network 116 and administrators of the enterprise 120 do not need to be aware of this list of allowed domains. In other implementations, this list of allowed domains is optionally re-configurable by an admin of the enterprise through a management interface 114 served through a web-based portal (discussed further below).

When one of the service agents (e.g., Service Agent A) of the DP service agentry 106 initiates a connection to its corresponding cloud-based DP software component (e.g., DP service A), the service agent does so by asking the gateway router 104 to tunnel a TCP connection to a domain of the associated cloud-based DP software component. In response, the gateway router 104 initiates a connection to the edge connectivity gateway 110 by asking the outbound traffic proxy 108 to tunnel a TCP connection to the edge connectivity gateway 110. If required by the enterprise's security configuration, the gateway router 104 authenticates itself to the outbound traffic proxy 108 as part of this exchange. Notably, "tunneling a TCP connection" is different from merely initiating a connection from one device to another. Tunneling, also known as "port forwarding," is the transmission of data intended for use within a private, network through a public network in such a way that the routing nodes in the public network are unaware that the transmission is part of a private network. Tunneling is generally done by encapsulating the private network data and protocol information within transmission units of a public network. The private data is encrypted and encapsulated at the origin and the de-capsulated and de-crypted at the destination.

As a result of the above-described operations, the outbound traffic proxy 108 receives an incoming connection request from the gateway router 104 and sees that the connection request needs to be forwarded to the edge connectivity gateway 110. The outbound traffic proxy 108 opens a forwarding connection to the edge connectivity gateway 110 and sends a confirmation to the gateway router 104 confirming that the requested connection has been established (e.g., by returning '200' to the http-connect of the gateway router 104).

At this point in time, the gateway router 104 has a TCP-like connection to the edge connectivity gateway 110. The gateway router 104 then authenticates itself (through the outbound traffic proxy 108) to the edge connectivity gateway 110 and requests that the edge connectivity gateway 110 forward the connection further to the initially requested cloud-based DP software component (e.g., DP service A) via a routing protocol of the edge connectivity gateway 110.

Once the above-described pipeline of forwarding connections is established all the way to the domain of the initially-requested cloud-based DP software component (e.g., domain of DP service A), the gateway router 104 transmits a confirmation to the requesting agent (e.g., Service Agent A) confirming that the connection has been established (e.g., by sending "200" back to Service Agent's "http-connect"). The requesting agent (e.g., Service Agent A) now has a TCP-like connection to its associated DP software component (e.g., DP Service A) and uses a regular TLS handshake to establish an end-to-end encrypted channel (e.g., encrypted channel between Service Agent A and DP Service A).

Once these tasks have been performed, an end-to-end encrypted channel exists between the requesting agentry and the corresponding DP via the outbound traffic proxy 108 and the edge connectivity gateway 110.

In some implementations, the edge connectivity gateway 110 implements security protocols designed to ensure that only requests from authorized on-premises machines are forwarded to the given cloud components. Granular control over these security protocols is, in one implementation, extended to technical administrator(s) of the enterprise 120 through the management interface 114. In the illustrated implementation, the management interface 114 is internal to a security boundary (not shown) of the cloud service network 116. The management interface 114 includes a web-based portal that allows an administrator of the enterprise 120 to runtime manage a list of allowed endpoints that traffic can be forwarded to and from the edge connectivity gateway 110. Unlike some types of off-the-shelf enterprise proxies that automatically apply security configuration changes to the entire on-premise network, the management interface 114 offers a same subset of controls on a per-device basis and is configured on behalf of the customer automatically (e.g., usinfg information automatically collected and transmitted by the gateway router 104), without onerous configuration actions on the customer end. Specifically, the management interface 114 allows an admin of the enterprise to optionally re-configure a list of allowed endpoints for each of multiple different edge devices on-premises at the enterprise 120 that are executing an instance of the gateway router 104. The administrator may elect to alter certain default settings, such as by disallowing access to some endpoints for a first subset of edge devices at the enterprise 120 while still allowing access to those endpoints for a second subset of edge devices at the enterprise 120. If, for example, the edge device 102 is executing Service Agent A, which requires access to "*.contoso.com", the administrator may choose to disallow access to this wildcard domain (or specific domains encompassed by the wildcard) for other edge devices of the enterprise that are not executing Service Agent A.

In different implementations, the edge connectivity gateway 110 leverages a variety of different techniques to provide the above-described granular control of the outbound traffic on a per-device basis. In some implementations, the edge connectivity gateway 110 filters traffic based on incoming IP address and/or based on outbound URL. If, for example, an administrator of the enterprise 120 alters a configuration in the management interface 114 to disallow communications between a first edge device of the enterprise 120 and specific set of endpoints, this action causes the edge connectivity gateway 110 to create and apply an IP-specific filter that prevents communications from the edge device's IP address from reaching the set of endpoints. Notably, enaction of this filter would not impede traffic from other IP address of the enterprise from reaching the same set of endpoints.

In another implementation, granular control of enterprise traffic is achieved by implementing URL-based filters at the edge connectivity gateway 110 that prevent traffic from the enterprise from reaching a specific prohibited set of URLs. For example, the edge connectivity gateway 110 implements a URL-specific filter that prevents all traffic from the enterprise 120 from reaching one or more prohibited URLs specified by an administrator in the management interface 114. In this scenario, the URL-based filter could selectively prevent traffic from reaching a subset of URLs associated with a wildcard domain that has been allow-listed for the enterprise 120 as a whole.

In various implementations, the edge connectivity gateway 110 has different characteristics. In one implementation, the edge connectivity gateway 110 is hosted as a globally-deployed multi-tenant service that serves to front-end traffic for edge customers looking to connect to the cloud. In another implementation, the edge connectivity gateway 110 is hosted as a single-tenant service as part of a networking resource provider and is available as a resource in the cloud. In either of the above implementations, the edge connectivity gateway 110 is implemented on one or more cloud-based servers and behaves as a forwarding proxy that receives requests from on-premises machines. The requests each specify an end destination, and the edge connectivity gateway 110 forwards that request to the end destination with or without TLS termination.

In one implementation, the edge connectivity gateway 110 is hosted in a well-known and static domain. The functionality of the DP service agentry 106 can be fully realized in a configuration in which the edge connectivity gateway 110 is the only domain allow-listed in the outbound traffic proxy 108.

Figure 2:
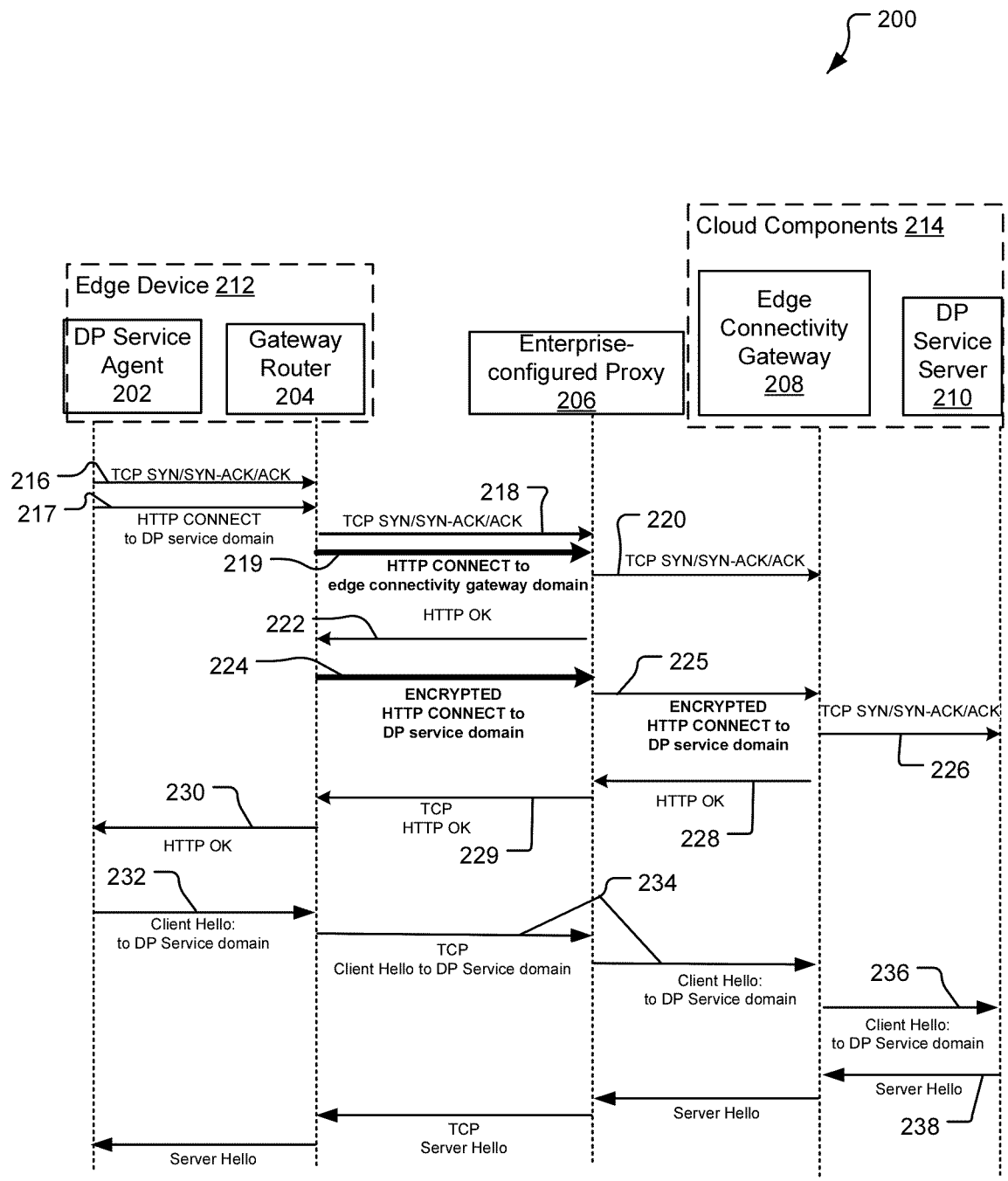
FIG. 2 illustrates an example communication sequence usable to establish an encrypted communication channel between a DP service agent and cloud-based server executing a DP service component.

FIG. 2 illustrates an example communication sequence 200 usable to establish an encrypted communication channel between a DP service agent 202 and server executing a cloud-based DP service component (DP service server 210). The DP service agent 202 is executed on an edge device 212 along with a gateway router 204 that serves as the designated forwarding proxy for the DP service agent 202. The communications shown and described are illustrative of a high-level sequence for a HTTP1.1-based connection.

In order to reach a particular DP service server 210 (e.g., a data plane service component), a DP service agent 202 first initiates a TCP session with the gateway router 204. In this exchange, the DP service agent 202 sends a TCP synchronize (SYN) packet to the gateway router 204, which serves as the default forwarding proxy for the DP service agent 202. The gateway router 204 receives the SYN packet and sends back an synchronize-acknowledgement (SYN-ACK) packet. The DP service agent then acknowledges the SYN-ACK by sending back an acknowledge (ACK) packet. This exchange is shown in FIG. 2 as operation 216, "TCP SYN/SYN-ACK/ACK."

Following this, DP service agent 202 transmits an initial connection request 217 by requesting that the gateway router 204 tunnel a TCP connection to a domain of the requested cloud-based DP software component.

The gateway router 204 is configured to utilize an enterprise-configured proxy 206 (e.g., an outbound traffic proxy/firewall of the enterprise) as its default forwarding proxy and responds to the connection request 217 by initiating a TCP session with the enterprise-configured proxy 206, as shown by operation 218 (e.g., another: TCP SYN/SYN-ACK/ACK). Additionally, the gateway router 204 transmits a first connection request 219 asking the enterprise-configured proxy 206 to open a TCP forwarding channel to the edge connectivity gateway 208.

The enterprise-configured proxy 206 responds to the connection request 219 by initiating a TCP session with an edge connectivity gateway 208, as shown by communication 220. The edge connectivity gateway 208 is a cloud-based gateway with characteristics the same or similar to those described with respect to the edge connectivity gateway 108 of FIG. 1. The enterprise-configured proxy 206 also sends a confirmation 222 to the gateway router 104 confirming that the requested connection has been established.

At this point in time, the gateway router 204 has a TCP-like connection to the edge connectivity gateway 208 through the enterprise-configured proxy 206. The gateway router 204 uses this TCP-like connection to initiate a TLS session with the edge connectivity gateway 208 (e.g., by a TLS handshake, not shown), and this TLS session converts the respective communication channel from a raw data channel to an encrypted data channel. Once the channel is encrypted, the enterprise-configured proxy 206 is not able to read communications that it forwards along the channel.

Once the TLS session is established between the gateway router 204 and the edge connectivity gateway 208, the gateway router 204 then transmits a second connection request 224. The second connection request 224 is referred to as "nested" with the first connection request 219 because it is sent along the TCP forwarding channel established by the first connection request 219. Specifically, the gateway router 204 transmits the second connection request 224 along the previously-established TCP forwarding channel (e.g., to the edge connectivity gateway 208 via the enterprise-configured proxy 206).

The second connection request 224 identifies the DP service server 210 as a requested destination, and the edge connectivity gateway 208 forwards this request to the DP service server 210. Since the second connection request 224 is encrypted via the aforementioned TLS-supported encryption, the enterprise-configured proxy 206 is unable to read the second connection request 224 and does not need to be configured for access to the DP service server 210.

The edge connectivity gateway 208 responds to the second connection request 224 by initiating a TCP connection with the DP service server, as shown by operation 226, and by transmitting a confirmation 228 indicating that the requested channel has been successfully opened. The enterprise-configured proxy 206 forwards this confirmation to the gateway router (e.g., forwarded confirmation 229), and the gateway router 204 then responds to the initial connection request 217 with a confirmation 230.

At this point in time, a TCP-like channel has been created between the DP service agent 202 and the DP service server 210. The DP service agent 202 can next use this TCP-like channel to initiate a TLS session (e.g., by way of a TLS handshake, not shown), which implements end-to-end encryption between the DP service agent 202 and the DP service server 210.

Following the above, the DP service agent 202 transmits a communication 232 to the gateway router 204 that has been encrypted via the keys used to establish the end-to-end encryption between the DP service agent 202 and the DP service server 210. The gateway router 204 adds another layer of encryption (via the keys used to establish the end-to-end encryption between the gateway router 204 and the edge connectivity gateway 208), and the double-encrypted communication is transmitted along the previously-established encrypted TCP channel to the edge connectivity gateway 208 via the enterprise-configured proxy 206 (e.g., via communication 234). The edge connectivity gateway 208 receives communication 234, removes the second layer of encryption, and forwards the communication to the DP service server (e.g., by communication 236). The DP service server 210 then decrypts the remaining layer of encryption, reads the communication 236, and generates a response 238 that is, in turn, propagated along the established encrypted TCP-like channel back to the DP service agent 202 using the same encryption protocols as described above, applied in the opposite direction.

In one implementation, data is not re-encrypted within the tunnel between the gateway router 204 and the edge connectivity gateway 208 since the traffic is ultimately encrypted end-to-end between the DP service agent 202 and the DP service server 210 (and re-encrypting unnecessarily increases processing overhead). In other implementations, multiple concurrent end-to-end connections are serviced (e.g., between a DP service agent and DP service server) via a single tunnel.

Notably, the above-described operations entails execution of two nested connection requests 219, 224 (e.g., http-connect requests) by the gateway router 204. These connection requests are indicated by bolded arrows and text and are referred to elsewhere herein as a "nested connect" sequence. The connection request 219 represents a first inner connect of the nested connect sequence and is effective to establish a first communication channel between the gateway router 204 and the edge connectivity gateway 208 via the enterprise-configured proxy 206. The second connection request 224 represents a second outer connect of the nested connect sequence and is effective to establish a second communication channel between the edge connectivity gateway 208 and the DP service server 210 requested by the DP service agent 202. In one implementation, the nested connection requests are http-connect requests; however, it is to be appreciated that other protocols, such as the VPN protocol, can be used to accomplish the same end goal.

The above-described architecture elegantly routes outbound communications from agents executing on edge devices through a trio of forwarding proxies (e.g., the gateway router 104, the enterprise-configured proxy 206, and the edge connectivity gateway 208) to securely establish connections between those edge device agents and the many different endpoints that the respective corresponding DP services depend upon. In the above-described communication sequence, the gateway router 204 serves as a forwarding proxy for the DP service agent 202, the enterprise-configured proxy 206 serves as a forwarding proxy for the gateway router 204, and the edge connectivity gateway 208 serves as a forwarding proxy for the communications that it receives along the encrypted forwarding channel that has been established through the enterprise-configured proxy 206.

If the edge connectivity gateway 208 is deployed as single-tenant service, a customer may choose to deploy multiple gateways in the cloud behind a traffic manager, for example, in order to balance and differentiate traffic that is being sent from various on-premises deployments or various agents on a single on-premises deployment. In various implementations, the gateway router 204 differentiates which instance of the edge connectivity gateway receives a given request based certificate-based validation and/or agent-based validation.

In some implementations, multiple edge connectivity gateways are employed and respectively configured to proxy to one or more different clouds or even the data center of the local enterprise. These gateways may be able to provide information on capability, cost, and availability, and are in some implementations provisioned by the respective local enterprise as part of a multi-cloud implementation, allowing a client application on an edge device to "choose" which cloud/data center service to use based on this information.

In one implementation, the tunneling protocol between the gateway router 204 and the edge connectivity gateway 208 is robust and secure, thereby mitigating single point of failure (SPOF) concerns and high performance. The secure tunneling facilitates authentication and authorization. In the above-described implementation, this is achieved by serving the edge connectivity gateway 208 over a TLS (e.g., port 443). The edge connectivity gateway 208 hosts a publicly verifiable certificate that the gateway router 204 can validate and establish a connection to. In return, the gateway router 204 is authenticated by the edge connectivity gateway 208 via an identity available on-premises at the enterprise.

Figure 3:
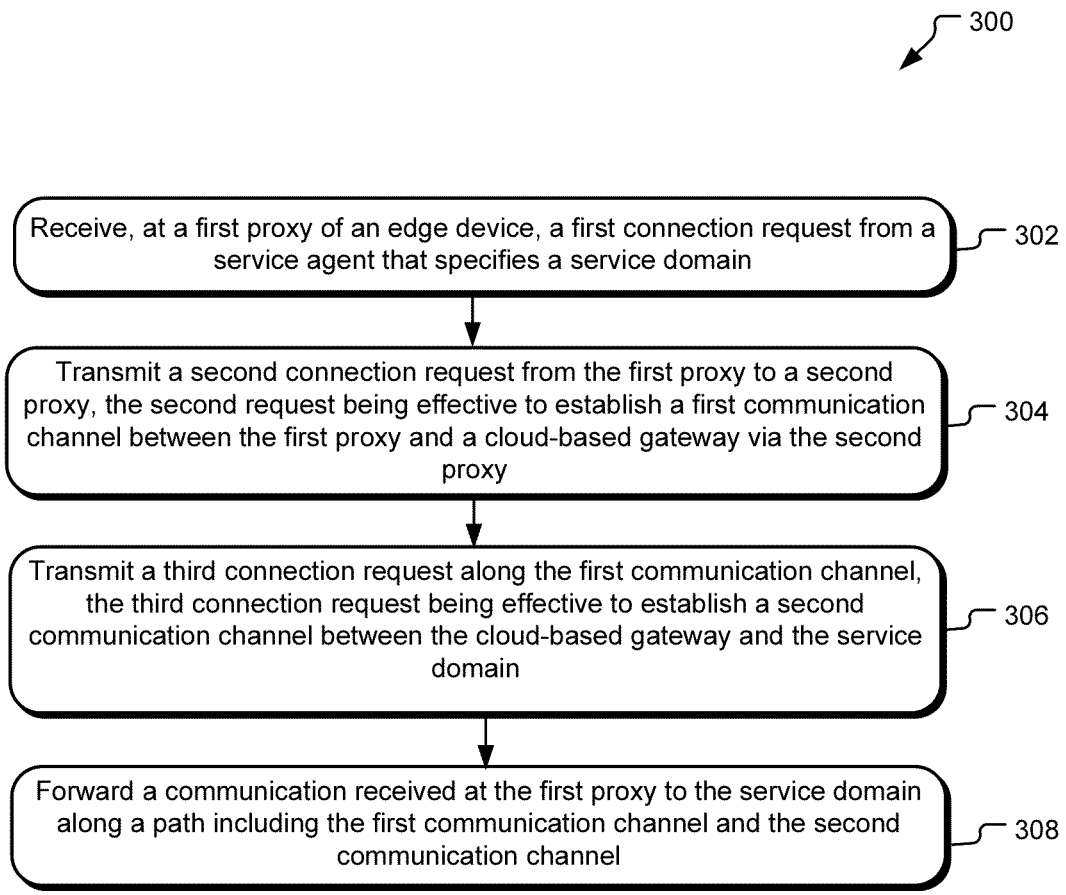
FIG. 3 illustrates example operations for establishing a communication channel between an edge device on-premise at an enterprise and a service domain without configuring an outbound proxy of the enterprise to allow connections to the service domain.

FIG. 3 illustrates example operations 300 for establishing a communication channel between an edge device on-premise at an enterprise and a domain of a data plane service ("service domain") without configuring an outbound proxy of the enterprise to allow connections to the service domain. A receiving operation 302 receives, at a first proxy of the edge device, a first connection request from a service agent. The first connection request specifies the service domain as a requested destination. Both the service agent and the first proxy execute on the edge device.

A transmission operation 304 transmits a second connection request in response to the first connection request. Specifically, the second connection request is transmitted from the first proxy (on the edge device) to a second proxy that is external to the edge device and, in one implementation, on-premise at the enterprise. The second proxy is an outbound traffic proxy (e.g., firewall) for the enterprise. The second communication request is effective to establish a first communication channel between the first proxy on the edge device and a cloud-based gateway external to the enterprise. This communication channel is tunneled through the second proxy (e.g., the outbound traffic proxy of the enterprise).

In one implementation, the operations 300 further include a TLS handshake (not shown) along the first communication channel that transforms the channel that converts the respective communication channel from a raw data channel to a TLS-encrypted data channel, with the encryption being end-to-end between the first proxy and the cloud-based gateway. Other implementations exclude this step in view of the fact that another layer of end-to-end encryption is eventually established, as described below, between the DP service agent and the service domain.

Another transmission operation 306 transmits a third connection request in response to successful establishment of the first communication channel. The third communication request is transmitted by the first proxy (e.g., on the edge device) and along the first communication channel to the cloud-based gateway. Once received and processed by the cloud-based gateway, the third communication request effectively extends the first communication channel by adding an additional "hop" from the cloud-based gateway and the service domain requested by the service agent. This additional hop can also be understood as a secondary communication channel that is appended to the end of the first communication channel.

In response to initial establishment of the second communication channel, a TLS handshake is optionally performed to encrypt communications traveling end-to-end along the final resulting communication channel (e.g., the second communication channel appended to the first communication channel).

A receipt and forwarding operation 308 receives, at the first proxy, a communication from the service agent and forwards this communication to the service domain along the final resulting communication channel that includes both the first communication channel and the second communication channel.

Figure 4:
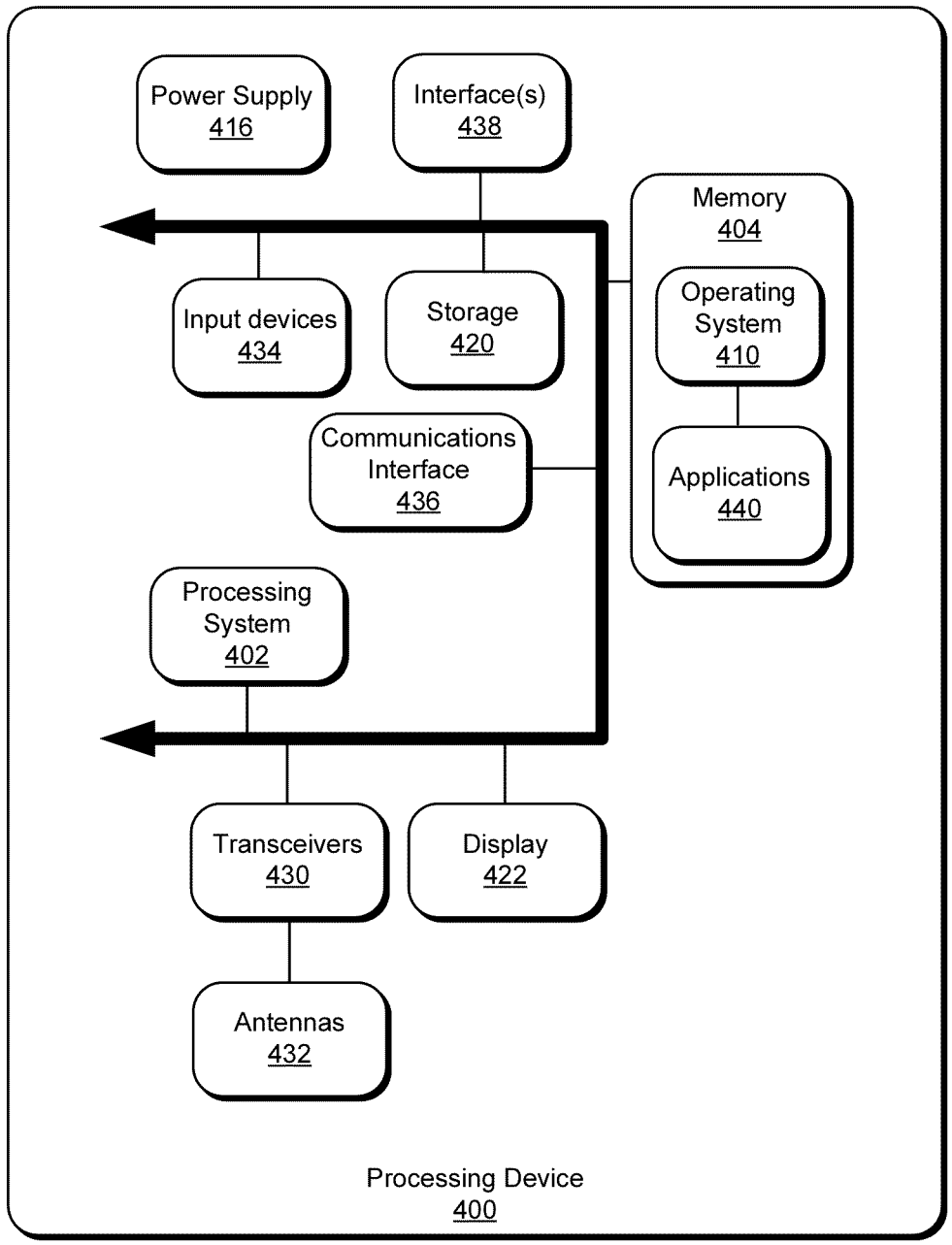
FIG. 4 illustrates an example schematic of a processing device suitable for implementing aspects of the disclosed technology.

FIG. 4 illustrates an example processing device 400 suitable for implementing aspects of the disclosed technology. The processing device 400 includes a processing system 422, memory device(s) 404, a display 406, and other interfaces 408 (e.g., buttons). The processing system 402 may include one or more computer processing units (CPUs), graphics processing units (GPUs), etc.

The memory device(s) 404 generally includes both volatile memory (e.g., RAM) and non-volatile memory (e.g., flash memory). An operating system 410, such as the Microsoft Windows® operating system, phone operating system, or a specific operating system designed for a gaming device, may reside in the memory device(s) 404 and be executed by the processing system 422, although it should be understood that other operating systems may be employed.

One or more applications 440 (e.g., DP service agentry 106, a gateway router 104, edge connectivity gateway 110, or various software components of DP services 112) are loaded in the memory device(s) 404 and executed on the operating system 410 by the processor system 402. The applications 412 may receive inputs from one another as well as from various input devices 434 such as a microphone, input accessory (e.g., keypad, mouse, stylus, touchpad, gamepad, racing wheel, joystick), or camera. Additionally, the applications 440 may receive input from one or more remote devices, such as remotely-located smart devices, by communicating with such devices over a wired or wireless network using more communication transceivers 430 and an antenna 432 to provide network connectivity (e.g., a mobile phone network, Wi-Fi®, Bluetooth®). The processing device 400 may also include one or more storage devices 420 (e.g., non-volatile storage). Other configurations may also be employed.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes random access memories (RAM), read-only memories (ROM), electrically erasable programmable read-only memory (EEPROM), flash memory or other memory technology, compact disk read-only memory (CDROM), digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Various implementations of the disclosed technology include methods, systems, and articles of manufacture for implementing the disclosed logical operations. n article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a method for establishing a communication channel between a service agent executing on an edge device and a cloud-based service component, the method including: receiving, at a first proxy, a first connection request from the service agent that specifies a service domain associated with the cloud-based service component; in response to receipt of the first connection request, transmitting a sequence of nested connection requests by the first proxy, the sequence of nested connection requests including: an inner connection request that establishes a first communication channel between the first proxy and a cloud-based gateway via a second proxy; and an outer connection request transmitted along the first communication channel that establishes a second communication channel between the cloud-based gateway and the service domain requested by the service agent; and transmitting, by the first proxy, a communication from the service agent to the service domain along a path including the first communication channel and the second communication channel.

In some aspects, the techniques described herein relate to a method, wherein the second proxy is an outbound traffic proxy of an enterprise and the edge device is on-premise at the enterprise.

In some aspects, the techniques described herein relate to a method, wherein the outbound traffic proxy of the enterprise implements security settings that prohibit outbound communications with the service domain and the communication is transmitted to the service domain without modifying the security settings of the outbound traffic proxy to permit communications with the service domain.

In some aspects, the techniques described herein relate to a method, wherein traffic directed along the path by the first proxy is sequentially received by the second proxy, the cloud-based gateway, and the service domain.

In some aspects, the techniques described herein relate to a method, wherein the first communication channel is encrypted end-to-end between the first proxy and the cloud-based gateway, and wherein the outer connection request is sent along the first communication channel.

In some aspects, the techniques described herein relate to a method, wherein the outbound traffic proxy of the enterprise serves as a forwarding proxy that cannot read content of the outer connection request.

In some aspects, the techniques described herein relate to a method, wherein the inner connection request identifies the cloud-based gateway as a first requested destination and wherein the outer connection request specifies the service domain as a second requested destination.

In some aspects, the techniques described herein relate to a method, further including: in response to user input received through a management interface of the cloud-based gateway, configuring security settings associated with the enterprise to prohibit a first set of enterprise devices from accessing a first set of endpoint while allowing second set of enterprise devices to access the first set of endpoint.

In some aspects, the techniques described herein relate to a method, further including: initiating, by the first proxy, a transport layer security (TLS) handshake to establish an end-to-end encrypted channel between the first proxy and the cloud-based gateway.

In some aspects, the techniques described herein relate to a system for establishing a communication channel between a cloud-based service component and a service agent executing on an edge device on-premise at an enterprise, the system including: a first proxy executing on the edge device, the first proxy configured to: receive a service domain connection request from a service agent, the service domain connection request specifying a service domain associated with a cloud-based service; in response to receipt of the service domain connection request, transmitting a nested sequence of connection requests including: an inner connection request that establishes a first communication channel between the first proxy and a cloud-based gateway via a second proxy; and an outer connection request transmitted along the first communication channel that establishes a second communication channel between the cloud-based gateway and the service domain requested by the service agent.

In some aspects, the techniques described herein relate to a system, wherein the first proxy is further configured to direct a communication received from the service agent to the service domain along a path that includes first communication channel and the second communication channel.

In some aspects, the techniques described herein relate to a system, wherein the second proxy is an outbound traffic proxy of an enterprise and the edge device is on-premise at the enterprise.

In some aspects, the techniques described herein relate to a system, wherein the second proxy implements security settings that prohibit outbound communications with the service domain and the communication is transmitted from the service agent to the service domain without modifying the security settings of the outbound traffic proxy to permit communications with the service domain.

In some aspects, the techniques described herein relate to a system, wherein the first communication channel is encrypted end-to-end between the first proxy and the cloud-based gateway, and wherein the outer connection request is sent along the first communication channel.

In some aspects, the techniques described herein relate to a system, wherein the second proxy is unable to read the outer connection request.

In some aspects, the techniques described herein relate to a system, wherein the inner connection request identifies the cloud-based gateway as a first requested destination and wherein the outer connection request specifies the service domain as a second requested destination.

In some aspects, the techniques described herein relate to a system, wherein the edge device is on-premise at an enterprise and the system further includes: a management interface associated with the cloud-based gateway, the management interface providing a security controls that allow an authorized user to modify security settings associated with the enterprise.

In some aspects, the techniques described herein relate to a tangible computer-readable storage media storing processor-executable instructions for executing a computer process for establishing a communication channel between a cloud-based service component and a service agent executing on an edge device, the computer process including: receiving, at a first proxy, a service domain connection request from the service agent that specifies a service domain associated with a cloud-based service; in response to receipt of the service domain connection request, transmitting a sequence of nested connection requests by the first proxy, the sequence of nested connection requests including: an inner connection request that establishes a first communication channel between the first proxy and a cloud-based gateway via a second proxy; and an outer connection request transmitted along the first communication channel that establishes a second communication channel between the cloud-based gateway and the service domain requested by the service agent; and directing, by the first proxy, a communication from the service agent to the service domain along a path including the first communication channel and the second communication channel.

In some aspects, the techniques described herein relate to a tangible computer-readable storage media, wherein the second proxy is an outbound traffic proxy of an enterprise and the edge device is on-premise at the enterprise.

In some aspects, the techniques described herein relate to a tangible computer-readable storage media, wherein the outbound traffic proxy of the enterprise implements security settings that prohibit outbound communications with the service domain and the communication is transmitted to the service domain without modifying the security settings of the outbound traffic proxy to permit communications with the service domain. The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A method for establishing a communication channel between a service agent executing on an enterprise edge device and a cloud-based service component, the method comprising:
    receiving, at a first proxy executed by the enterprise edge device, a first connection request from the service agent that specifies a service domain associated with the cloud-based service component;
    in response to receipt of the first connection request, transmitting a sequence of nested connection requests by the first proxy, the sequence of nested connection requests including:
        an inner connection request transmitted by the first proxy at the enterprise edge device to a second proxy that performs outbound traffic control for an enterprise, the inner connection request instructing the second proxy to open a first forwarding channel to a cloud-based gateway,
        wherein the first proxy uses the first forwarding channel to initiate an encrypted session with the cloud-based gateway such that data subsequently transmitted along the first forwarding channel is unreadable by the second proxy that forwards the data to the cloud-based gateway;
        an outer connection request transmitted to the cloud-based gateway along the first forwarding channel, the outer connection request being in an encrypted form unreadable by the second proxy and instructing the cloud-based gateway to open a second forwarding channel to the service domain requested by the service agent; and
    transmitting, by the first proxy, a communication from the service agent to the service domain along a path including the first forwarding channel and the second forwarding channel.

2. The method of claim 1, wherein the second proxy is an outbound traffic proxy of an enterprise and the enterprise edge device is on-premise at the enterprise.

3. The method of claim 2, wherein the outbound traffic proxy of the enterprise implements security settings that prohibit outbound communications with the service domain and the communication is transmitted to the service domain without modifying the security settings of the outbound traffic proxy to permit communications with the service domain.

4. The method of claim 2, wherein the first forwarding channel is encrypted end-to-end between the first proxy and the cloud-based gateway, and wherein the outer connection request is sent along the first forwarding channel.

5. The method of claim 4, wherein the outbound traffic proxy of the enterprise serves as a forwarding proxy that cannot read content of the outer connection request.

6. The method of claim 2, further comprising:
in response to user input received through a management interface of the cloud-based gateway, configuring security settings associated with the enterprise to prohibit a first set of enterprise devices from accessing a first set of endpoint while allowing second set of enterprise devices to access the first set of endpoint.

7. The method of claim 1, wherein traffic directed along the path by the first proxy is sequentially received by the second proxy, the cloud-based gateway, and the service domain.

8. The method of claim 1, wherein the inner connection request identifies the cloud-based gateway as a first requested destination and wherein the outer connection request specifies the service domain as a second requested destination.

9. The method of claim 1, further comprising:
initiating, by the first proxy, a transport layer security (TLS) handshake to establish an end-to-end encrypted channel between the first proxy and the cloud-based gateway.

10. A system for establishing a communication channel between a cloud-based service component and a service agent executing on an enterprise edge device on-premise at an enterprise, the system comprising:
a first proxy executing on the enterprise edge device, the first proxy configured to:
receive a service domain connection request from a service agent, the service domain connection request specifying a service domain associated with a cloud-based service;
in response to receipt of the service domain connection request, transmit a nested sequence of connection requests including:
an inner connection request transmitted by the first proxy to a second proxy that performs outbound traffic control of the enterprise, the inner connection request instructing the second proxy to open a first forwarding channel to a cloud-based gateway,
wherein the first proxy uses the first forwarding channel to initiate an encrypted session with the cloud-based gateway such that data subsequently transmitted along the first forwarding channel is unreadable by the second proxy that forwards the data to the cloud-based gateway; and
an outer connection request transmitted to the cloud-based gateway along the first forwarding channel, the outer connection request being in an encrypted form unreadable by the second proxy and instructing the cloud-based gateway to open a second forwarding channel to the service domain requested by the service agent.

11. The system of claim 10, wherein the first proxy is further configured to direct a communication received from the service agent to the service domain along a path that includes first forwarding channel and the second forwarding channel.

12. The system of claim 11, wherein the second proxy implements security settings that prohibit outbound communications with the service domain and the communication is transmitted from the service agent to the service domain without modifying the security settings of the outbound traffic proxy to permit communications with the service domain.

13. The system of claim 10, wherein the second proxy is an outbound traffic proxy of an enterprise and the enterprise edge device is on-premise at the enterprise.

14. The system of claim 10, wherein the first forwarding channel is encrypted end-to-end between the first proxy and the cloud-based gateway, and wherein the outer connection request is sent along the first forwarding channel.

15. The system of claim 14, wherein the second proxy is unable to read the outer connection request.

16. The system of claim 10, wherein the inner connection request identifies the cloud-based gateway as a first requested destination and wherein the outer connection request specifies the service domain as a second requested destination.

17. The system of claim 10, wherein the enterprise edge device is on-premise at an enterprise and the system further comprises:
a management interface associated with the cloud-based gateway, the management interface providing a security controls that allow an authorized user to modify security settings associated with the enterprise.

18. A tangible computer-readable storage media storing processor-executable instructions for executing a computer process for establishing a communication channel between a cloud-based service component and a service agent executing on an enterprise edge device, the computer process comprising:
receiving, at a first proxy executed by the enterprise edge device, a service domain connection request from the service agent that specifies a service domain associated with a cloud-based service;
in response to receipt of the service domain connection request, transmitting a sequence of nested connection requests by the first proxy, the sequence of nested connection requests including:
an inner connection request transmitted by the first proxy at the enterprise edge device to a second proxy that performs outbound traffic control of an enterprise, the inner connection request instructing the second proxy to open a first forwarding channel to a cloud-based gateway, wherein the first proxy uses the first forwarding channel to initiate an encrypted session with the cloud-based gateway such that data subsequently transmitted along the first forwarding channel is unreadable by the second proxy that forwards the data to the cloud-based gateway; and
an outer connection request transmitted to the cloud-based gateway along the first forwarding channel, the outer connection request being in an encrypted form unreadable by the second proxy and instructing the cloud-based gateway to open a second forwarding channel to the service domain requested by the service agent; and
transmitting, by the first proxy, a communication from the service agent to the service domain along a path including the first forwarding channel and the second forwarding channel.

19. The tangible computer-readable storage media of claim 18, wherein the second proxy is an outbound traffic proxy of an enterprise and the enterprise edge device is on-premise at the enterprise.

20. The tangible computer-readable storage media of claim 19, wherein the outbound traffic proxy of the enterprise implements security settings that prohibit outbound communications with the service domain and the communication is transmitted to the service domain without modifying the security settings of the outbound traffic proxy to permit communications with the service domain.

* * * * *